Patented Mar. 2, 1926.

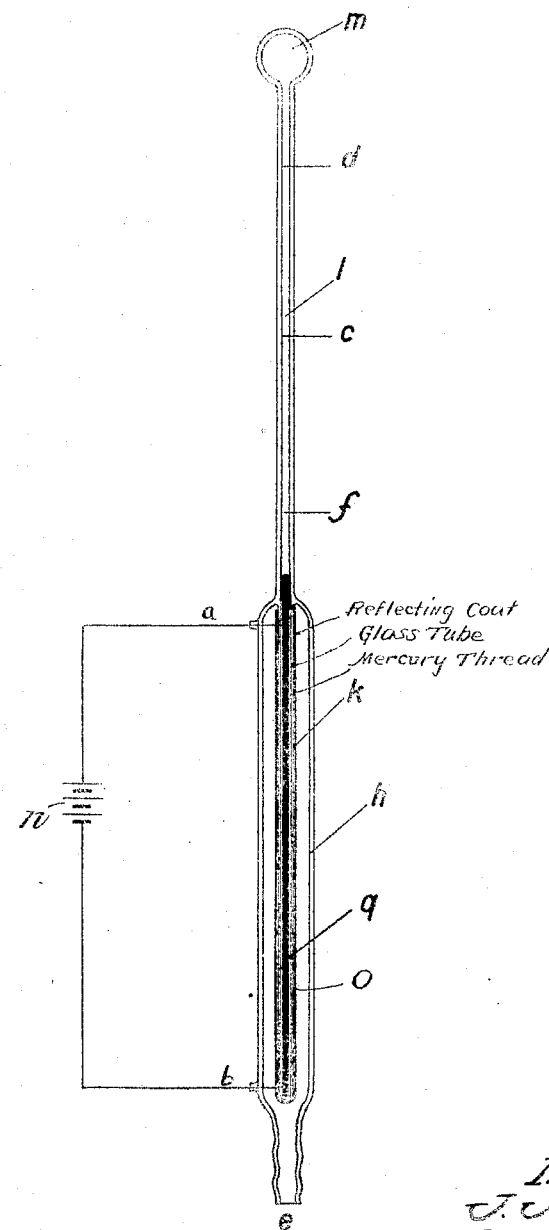

1,575,059

UNITED STATES PATENT OFFICE.

JULIUS JONAS, OF MEIERHOF, AND OSKAR SEITZ, OF OBERER KAPPELERHOF, BADEN, SWITZERLAND, ASSIGNORS TO AKTIENGESELLSCHAFT BROWN, BOVERI AND CIE., OF BADEN, SWITZERLAND.

DIRECT-INDICATING HIGH-VACUUM METER.

Application filed February 5, 1923. Serial No. 617,117.

*To all whom it may concern:*

Be it known that we, JULIUS JONAS, a citizen of the German Realm, residing at Meierhof, Baden, Switzerland, and OSKAR SEITZ, a citizen of the Swiss Republic, residing at Oberer Kappelerhof, Baden, Switzerland, have jointly invented certain new and useful Improvements in Direct-Indicating High-Vacuum Meters, of which the following is a specification.

It is known that the heat-conductivity of a gas is constant within wide limits of pressure, but that it diminishes with the density of the gas in the case of a very high vacuum, approximately when the distance between the molecules corresponds to the length of their free movement so that from absolute vacuum onwards a relation of proportion exists between the density and the heat-conductivity.

This phenomenon allows of constructing sensitive direct-indicating high-vacuum meters having their range of sensitiveness situated in the region of high vacua, whereas they are much less accurate in the case of low vacua. All vacuum meters of this kind hitherto known have however, certain drawbacks which render them unsuitable for purely technical use.

The present invention has now for its object to provide an improved direct-acting high-vacuum meter consisting of a mercury thermometer whose tubular bulb containing the mercury is surrounded by a cylindrical tube fitted gas-tight upon it, which is in communication with the vacuum which is to be measured, the arrangement being such that the mercury of the thermometer is heated by means of energy supplied from outside in as constant a manner as possible.

An embodiment of this invention is illustrated by way of example in the accompanying drawing in which:—

$k$ is the thermometer bulb containing the mercury $q$;

$l$ is the capillary tube in which the mercury rises when the bulb $k$ is heated;

$h$ is a glass tube surrounding the bulb $k$ and fused thereon in a gas-tight manner;

$e$ is a connecting tube for connecting the vacuum meter to the vacuum which is to be measured;

$m$ is a spherical enlargement at the end of the capillary tube $l$;

$a$ and $b$ are contact wires fused into the tubes $h$ and $k$; they are electrically connected to the mercury $q$;

$f, c, d$ are register marks which may however be replaced by platinum wires likewise fused-in.

The operation of this improved vacuum meter is as follows:—First the tube $e$ is connected in a gas-tight manner to the vacuum to be measured. Then electric current from a supply of energy $n$, which should be as constant as possible, is led through $a$ and $b$ and then the mercury $q$ whereby this mercury is raised to and maintained at such a temperature as will cause it to rise in the capillary tube exactly up to the mark $c$.

In the unheated state of the thermometer the mercury meniscus sinks below the mark $f$. If now the receiver be exhausted of air, the heat-conductivity of the air situated in the cylindrical cavity between $h$ and $k$ will drop in the case of a high vacuum, and the mercury will finally reach the mark $d$ in the case of the maximum vacuum that is practically attainable. The position of the meniscus is thus a measure for the degree of vacuum surrounding the thermometer bulb.

In order to avoid as much as possible any loss of heat through radiation, the bulb $k$ is surrounded with a reflecting coat $o$.

The sensitiveness of the improved high-vacuum meter is greater, the finer the bore of the capillary tube. But if on the other hand the cross-section of the capillary tube is too small, there is a great tendency for the mercury thread to break and stick. This drawback can be avoided by filling the space above the mercury with a highly compressed gas, for instance, the neutral gas nitrogen. This has a two-fold advantage first because the boiling point of mercury is higher under high pressure, and second, because this arrangement prevents the thread from breaking. The higher boiling point allows of employing a high heating temperature of the bulb $k$, so that the influence of the fluctuation of the temperature of the room upon the correct operation of the improved vacuum meter is negligible.

The compression-pressure of the gas over the mercury may amount to many atmospheres, but in order to avoid too great a strain upon the glass walls when the mercury is heated to a high temperature, it is necessary to employ the spherical dome $m$ which prevents any appreciable rise of the pressure.

Instead of supplying the energy directly to the mercury in the vacuum meter, resistance wires may be employed to heat the bulb $k$ from the outside, or such wires may be led through the mercury in the bulb.

The radial distance of the enveloping tube $h$ from the bulb $k$ must not be too great, in order that the lag of the readings of the instrument shall be kept as small as possible. It is advisable to make this distance smaller than the free-travel range of the gas molecules under a normal degree of high-vacuum.

What we claim is:—

1. In an apparatus for measuring high vacua by direct indication, the combination with a mercury thermometer having a tubular mercury bulb, of a cylindrical enclosing tube fitted gas-tight upon, and surrounding said tubular bulb so as to leave an annular space between said enclosing tube and said tubular bulb, a tube connecting said annular space to the vacuum which is to be measured, and means for providing an approximately constant supply of energy for heating the mercury in said tubular bulb.

2. In an apparatus for measuring high vacua by direct indication, comprising the combination claimed in claim 1, the tubular bulb having an elongated form and a relatively fine bore so as to give to its contained mercury the form of a thin thread, and a capillary tube extending upward from said tubular bulb in which the heated mercury can rise.

3. In an apparatus for measuring high vacua by direct indication, comprising the combination claimed in claim 1, the tubular bulb having an elongated form and a relatively fine bore and a capillary tube extending upward from said tubular bulb, compressed neutral gas in the space over the mercury in the capillary tube, and an enlargement at the outer end of said capillary tube, whereby the occurrence of a high compression-pressure in said capillary tube is prevented when the mercury rises in the latter.

4. In an apparatus for measuring high vacua by direct indication the combination with a mercury thermometer having a tubular mercury bulb, of a cylindrical enclosing tube fitted gas-tight upon, and surrounding said tubular bulb so as to leave an annular space between said enclosing tube and said tubular bulb, said space having a radial dimension smaller than the free travel-range of the molecules of the gas in said annular space under the normal high vacuum, a tube connecting said annular space to the vacuum which is to be measured, and means for providing an approximately constant supply of energy for heating the mercury in said tubular bulb.

5. In an apparatus for measuring high vacua by direct indication, the combination with a mercury thermometer having a tubular mercury bulb of a cylindrical enclosing tube fitted gas-tight upon, and surrounding said tubular bulb so as to leave an annular space between said enclosing tube and said tubular bulb, a tube connecting said annular space to the vacuum which is to be measured, and means for passing an approximately constant electric current directly through the mercury in said tubular bulb and thereby heating said mercury.

6. In an apparatus for measuring high vacua by direct indication, the combination with a mercury thermometer having a tubular mercury bulb, having a highly reflecting mirror-like external surface of a cylindrical enclosing tube fitted gas-tight upon, and surrounding said tubular bulb so as to leave an annular space between said enclosing tube and said tubular bulb, a tube connecting said annular space to the vacuum which is to be measured and means for providing an approximately constant supply of energy for heating the mercury in said tubular bulb.

7. In an apparatus for measuring high vacua by direct indication, the combination with a mercury thermometer having a tubular mercury bulb, of a cylindrical enclosing tube fitted gas-tight upon, and surrounding said tubular bulb so as to leave an annular space between said enclosing tube and said tubular bulb, a tube connecting said annular space to the vacuum which is to be measured and means for providing an approximately constant supply of energy for heating the mercury in said tubular bulb to such a degree as to ensure that a fluctuation in the temperature of the room in which said measuring apparatus is located, shall not have any appreciable effect upon the correct operation of said apparatus.

In testimony whereof we have signed our names to this specification.

JULIUS JONAS.
OSKAR SEITZ.